United States Patent
Ohtake et al.

(10) Patent No.: US 12,211,531 B2
(45) Date of Patent: Jan. 28, 2025

(54) MAGNETIC RECORDING AND REPRODUCING DEVICE

(71) Applicants: Kabushiki Kaisha Toshiba, Tokyo (JP); Toshiba Electronic Devices & Storage Corporation, Tokyo (JP)

(72) Inventors: Masaya Ohtake, Fujisawa Kanagawa (JP); Kaori Kimura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/459,152

(22) Filed: Aug. 31, 2023

(65) Prior Publication Data

US 2024/0321305 A1    Sep. 26, 2024

(30) Foreign Application Priority Data

Mar. 22, 2023   (JP) .................................. 2023-045569

(51) Int. Cl.
    *G11B 5/54*    (2006.01)
    *G11B 5/40*    (2006.01)
    *G11B 5/60*    (2006.01)
    *G11B 33/14*   (2006.01)
    *G11B 5/00*    (2006.01)

(52) U.S. Cl.
    CPC .............. *G11B 5/6011* (2013.01); *G11B 5/40* (2013.01); *G11B 2005/0021* (2013.01)

(58) Field of Classification Search
    CPC . G11B 33/1466; G11B 33/10; G11B 33/1486; G11B 33/1453; G11B 5/00; G11B 5/54; G11B 33/14; G11B 33/1406; G11B 33/1446
    USPC ................................................ 360/75, 97.12
    See application file for complete search history.

(56) References Cited

U.S. PATENT DOCUMENTS

| | | | | |
|---|---|---|---|---|
| 7,808,738 B2 * | 10/2010 | Mitsunaga | ........... | G11B 5/6064 360/75 |
| 8,094,409 B2 * | 1/2012 | Feliss | ................... | G11B 25/043 360/97.22 |
| 8,107,185 B2 * | 1/2012 | Okamoto | ............ | G11B 5/6064 360/75 |
| 8,885,287 B1 * | 11/2014 | Koike | .................. | G11B 33/148 360/97.12 |
| 9,177,599 B1 * | 11/2015 | Camalig | ................ | G11B 21/21 |
| 10,468,071 B1 | 11/2019 | Tasaka et al. | | |
| 2020/0152233 A1 | 5/2020 | Liu et al. | | |
| 2021/0210121 A1 | 7/2021 | Turner et al. | | |
| 2021/0407541 A1 | 12/2021 | Wu et al. | | |

* cited by examiner

*Primary Examiner* — Nabil Z Hindi
(74) *Attorney, Agent, or Firm* — Kim & Stewart LLP

(57) ABSTRACT

A magnetic recording and reproducing device includes a magnetic recording medium including a protective layer that is exposed to an enclosed interior volume of the magnetic recording and reproducing device, which contains oxygen and helium, a magnetic head including a heat assist element that is also exposed to the enclosed interior volume, the magnetic head configured to record data onto the magnetic recording medium, and an oxygen amount measurement unit configured to measure an oxygen amount in the enclosed interior volume.

16 Claims, 10 Drawing Sheets

MAGNETIC RECORDING AND REPRODUCING DEVICE

CROSS-REFERENCE TO RELATED APPLICATION(S)

This application is based upon and claims the benefit of priority from Japanese Patent Application No. 2023-045569, filed Mar. 22, 2023, the entire contents of which are incorporated herein by reference.

FIELD

Embodiments described herein relate generally to a magnetic recording and reproducing device.

BACKGROUND

An example of a magnetic recording and reproducing device is a hard disk drive (HDD). One of HDD recording methods is heat-assisted magnetic recording method (HAMR). HAMR has a mode in which materials such as a protective layer or a lubricating layer in the HDD are decomposed by heat or light, carbon is released into the enclosed interior volume of the device and is collected at the tip of the near-field optical element, resulting in failure. As countermeasures, a technique for putting oxygen into the HDD and burning the carbon has been proposed. However, when oxygen is introduced into a drive sealed with helium or the like, there is a problem that oxygen is consumed for purposes other than HAMR protection. Therefore, the initial oxygen concentration is required to be set so that a predetermined oxygen amount remains in the drive over time, depending on the oxygen consumption. In addition, there is a problem that, when oxygen is consumed over time, and the pressure in the device is reduced, the fly height of a slider changes, resulting in a head disk interface (HDI) failure.

DETAILED DESCRIPTION

Embodiments provide a magnetic recording and reproducing device capable of preventing a change in slider fly height due to a change in the oxygen amount in the device.

In general, according to one embodiment, there is provided a magnetic recording and reproducing device including a magnetic recording medium including a protective layer that is exposed to an enclosed interior volume of the magnetic recording and reproducing device, which contains oxygen and helium (He), a magnetic head including a heat assist element that is also exposed to the enclosed interior volume, the magnetic head configured to record data onto the magnetic recording medium, and an oxygen amount measurement unit configured to measure an oxygen amount in the enclosed interior volume.

According to the embodiment, it is possible to adjust the magnetic recording and reproducing device in accordance with the change in the oxygen amount in the enclosed interior volume of the device as measured by the oxygen amount measurement unit.

The protective layer may include a lubricating layer that is provided on the protective layer and is configured with a lubricant. The oxygen amount measurement unit may include, for example, an oxygen meter or an oxygen amount prediction circuit that predicts the oxygen amount based on a bit error rate in the data read from the magnetic recording and reproducing device. The oxygen amount may be set to be 1 to 20% by volume of the device's enclosed interior volume. When the oxygen amount is set to be within the range of 1 to 20% by volume, it tends to enable securing of long-term reliability of the device, for example, reliability for 5 years. When the oxygen amount is set to be outside the above range, it tends to be difficult to secure long-term reliability.

Hereinafter, embodiments will be described with reference to the drawings. It should be noted that the present disclosure is merely an example, and appropriate modifications that can be easily conceived by those skilled in the art while keeping the gist of the present disclosure are naturally included in the scope of the present disclosure. In addition, in order to make the description clearer, the drawings may schematically show the width, thickness, shape, and the like of each unit instead of the actual ones, but this is only an example, and this should not the interpretation of the present disclosure is not limited thereto. Further, in the present specification and the drawings, the same elements as those previously described with reference to the drawings are denoted by the same reference signs, and detailed description thereof may be omitted as appropriate.

Example 1

Figure 1:
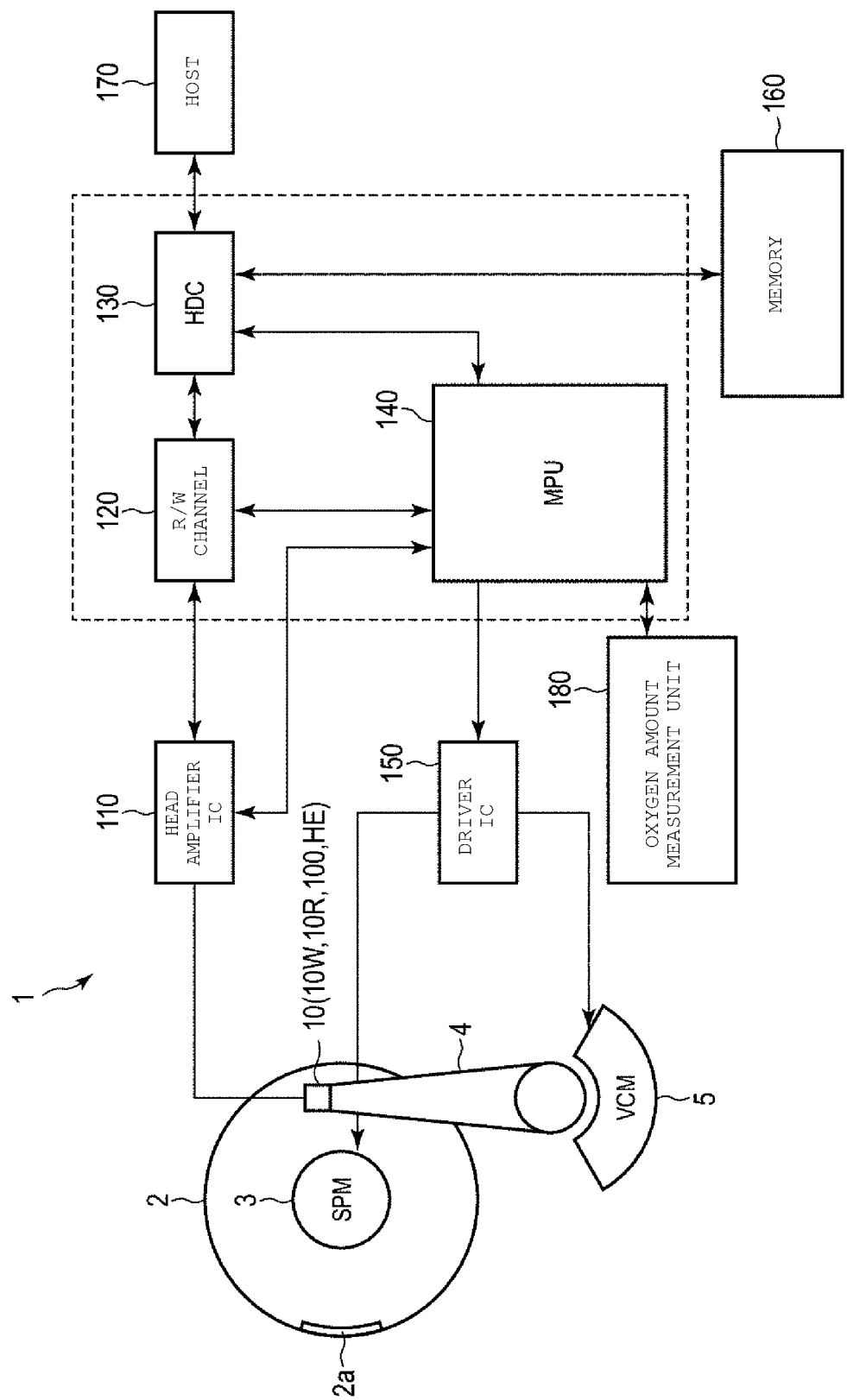
FIG. 1 is a block diagram showing an example of a control configuration of a magnetic recording and reproducing device according to an embodiment.

First, Example 1 will be described. FIG. 1 is a block diagram showing an example of a control configuration of a first magnetic recording and reproducing device according to the embodiment. As shown in FIG. 1, a first magnetic recording and reproducing device 1 includes a magnetic disk 2 as a magnetic recording medium, a spindle motor (SPM) 3 as a rotary drive unit, an actuator assembly 4, a voice coil motor (VCM) 5, and a magnetic head 10. A management area 2a for recording information for managing data to be recorded is provided in the magnetic disk 2. In the first magnetic recording and reproducing device 1, oxygen and He are present in the enclosed interior volume of the device.

The first magnetic recording and reproducing device 1 further includes a head amplifier IC 110, an R/W channel 120, a hard disk controller (HDC) 130, a microprocessor (MPU) 140, a driver IC 150, and a memory 160. The first magnetic recording and reproducing device 1 can be connected to a host computer (host) 170. The R/W channel 120, the HDC 130, and the MPU 140 may be incorporated in a one-chip integrated circuit.

The magnetic head 10 includes a write head 10W, a read head 10R, and an assist unit 100 including an assist element. The write head 10W writes data to the magnetic disk 2. The read head 10R reads data from the magnetic disk 2. The assist unit 100 assists in writing data when the write head 10W writes data to the magnetic disk 2. A heater HE adjusts the fly height of the write head 10W or the read head 10R with respect to the disk surface of the magnetic disk 2. The magnetic head 10 may include a single or a plurality of magnetic heads. The assist element includes a near-field optical element as a heat assist element, and further includes a laser light source that outputs laser light to the near-field optical element. Assist power applied to the assist element includes laser power such as a current applied to a laser light source.

The spindle motor 3 is driven by a drive current (or drive voltage) supplied from the driver IC 150. A data pattern is recorded and reproduced on the magnetic disk 2 by the magnetic head 10. A voice coil is operated by the voice coil motor 5, and the actuator assembly 4 is rotated from an unloaded position of a ramp loading mechanism (not shown). In this manner, the magnetic head 10 is moved to a desired track on the magnetic disk 2, and is positioned at a predetermined position on the magnetic disk 2. The voice coil motor 5 is driven by a drive current (or drive voltage) supplied from the driver IC 150.

The head amplifier IC 110 supplies a write signal (write current) corresponding to write data supplied from the R/W channel 120 to the write head 10W. The head amplifier IC 110 controls an optical output that is output from the assist unit 100. The head amplifier IC 110 amplifies a read signal output from the read head 10R and transmits the amplified signal to the R/W channel 120. Further, the head amplifier IC 110 adjusts the fly height of the write head 10W or the read head 10R with respect to the disk surface of the magnetic disk 2 by adjusting the voltage applied to the heater HE.

The R/W channel 120 is a signal processing circuit that processes signals related to read/write. The R/W channel 120 includes a read channel that performs signal processing on read data and a write channel that performs signal processing on write data. The read channel converts a read signal to digital data and demodulates read data from the digital data. The write channel encodes write data transferred from the HDC 130 and transfers the encoded write data to the head amplifier IC 110.

The HDC 130 controls writing of data to the magnetic disk 2 and reading of data from the magnetic disk 2 through the magnetic head 10, the head amplifier IC 110, the R/W channel 120, and the MPU 140. The HDC 130 is an interface circuit between the first magnetic recording and reproducing device 1 and the host 170, and controls transfer of read data and write data. That is, the HDC 130 functions as a host interface controller that receives a signal transferred from the host 170 and transfers a signal to the host 170. The HDC 130 also receives commands (write command, read command, and the like) transferred from the host 170 and transmits the received commands to the MPU 140.

An oxygen amount measurement unit 180 may be provided at any position in the device. The oxygen amount measurement unit 180 includes, for example, an oxygen meter or an oxygen sensor that measures an oxygen amount, and in some embodiments, a function of indirectly predicting the oxygen amount. The oxygen amount measurement unit 180 measures the oxygen amount in the enclosed interior volume of the first magnetic recording and reproducing device 1 at a timing for checking the oxygen amount. A measurement result is transmitted to the MPU 140.

The MPU 140 is the main controller of the first magnetic recording and reproducing device 1 and performs servo control and the like necessary for controlling read/write operations and positioning the magnetic head 10. The MPU 140 can control the head amplifier IC 110 in accordance with the measurement result of the oxygen amount from the oxygen amount measurement unit 180, and adjust the first magnetic recording and reproducing device 1 in accordance with the change in the oxygen amount, for example, adjust the fly height of the magnetic head 10, the assist power, and the like.

The driver IC 150 controls driving of the spindle motor 3 and the voice coil motor 5 under the control of the MPU 140. The magnetic head 10 is positioned at the target track on the magnetic disk 2 by driving the voice coil motor 5. The memory 160 includes a volatile memory and a non-volatile memory. For example, the memory 160 includes a flash memory and a buffer memory configured with a DRAM. Oxygen and He are enclosed in the first magnetic recording and reproducing device according to the embodiment.

Figure 2:
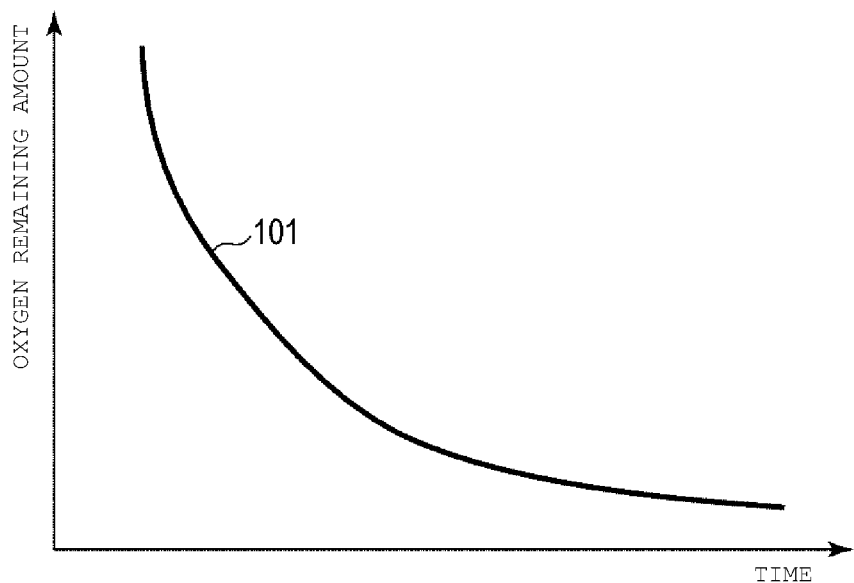
FIG. 2 is a graph showing an example of oxygen consumption with respect to elapsed time in the magnetic recording and reproducing device.

FIG. 2 is a graph showing an example of oxygen consumption with respect to elapsed time in the first magnetic recording and reproducing device. The reference sign 101 indicates a graph showing the relationship between the elapsed time and the oxygen remaining amount in the first magnetic recording and reproducing device. As shown in FIG. 2, when He or the like is enclosed in the sealed first magnetic recording and reproducing device and oxygen is further introduced, the oxygen is consumed over time. Oxygen may be consumed not only for the purpose of burning carbon generated on the surface of the heat assist element, but also for the oxidation reaction or the like of substances in the device. Therefore, when oxygen is enclosed, it is desired to adjust the initial oxygen concentration in accordance with the oxygen consumption of each first magnetic recording and reproducing device so that a predetermined oxygen amount remains in the drive even when some amount of time has elapsed.

Figure 3:
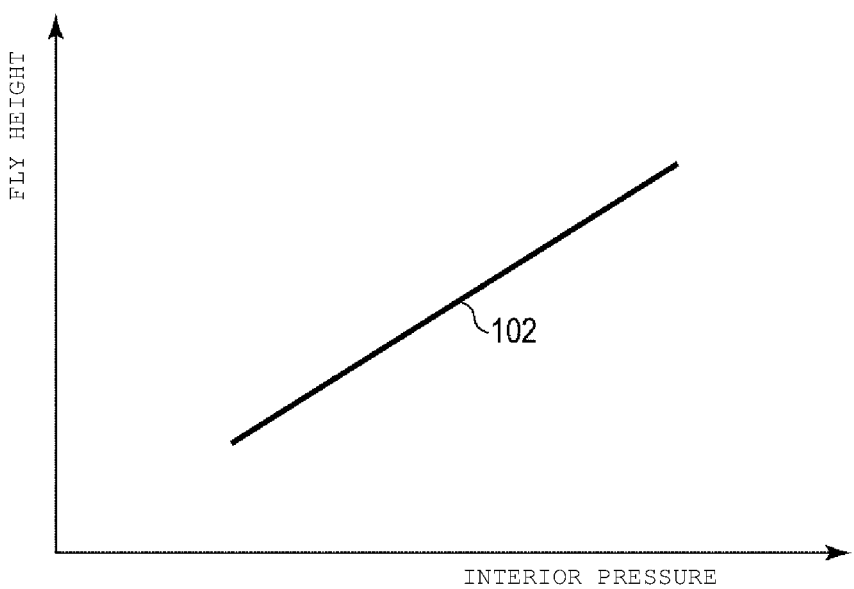
FIG. 3 is a graph showing an example of reduction in head fly height over time.

FIG. 3 shows a graph showing an example of a change in the fly height of the head with respect to the reduction in device's interior pressure over time. The reference sign 102 indicates a graph showing the relationship between the device's interior pressure and the fly height of the head. As shown in FIG. 3, when oxygen in the device is consumed over time, and thus the pressure in the device is reduced, the fly height of the head is reduced, resulting in an occurrence of HDI failure such as head crash, or a distance between the heat assist element and the recording surface approaches, resulting in a tendency where the medium tends to be excessively heated by the heat assist element. Therefore, by increasing the fly height or reducing the assist power, it is possible to adjust the first magnetic recording and reproducing device in accordance with the oxygen amount in the enclosed interior volume of the first magnetic recording and reproducing device. On the other hand, when the pressure in the device is reduced, the fly height of the head may increase. In this case, the head and the recording surface are spaced apart too much from each other. Thus, there is a tendency that magnetic recording with sufficient quality is not possible, or it is not sufficient to heat the medium by the heat assist element. Whether the fly height is reduced or increases depends on the configuration of the first magnetic recording and reproducing device. Therefore, by reducing the fly height or increasing the assist power, it is possible to adjust the first magnetic recording and reproducing device in accordance with the oxygen amount in the enclosed interior volume of the first magnetic recording and reproducing device.

As described above, according to the embodiment, in the heat-assisted magnetic recording and reproducing device in which oxygen is enclosed, since the oxygen amount measurement unit measures the oxygen amount, it is possible to adjust the fly height in accordance with the oxygen amount or adjust the assist power applied to the heat assist element.

Figure 4:
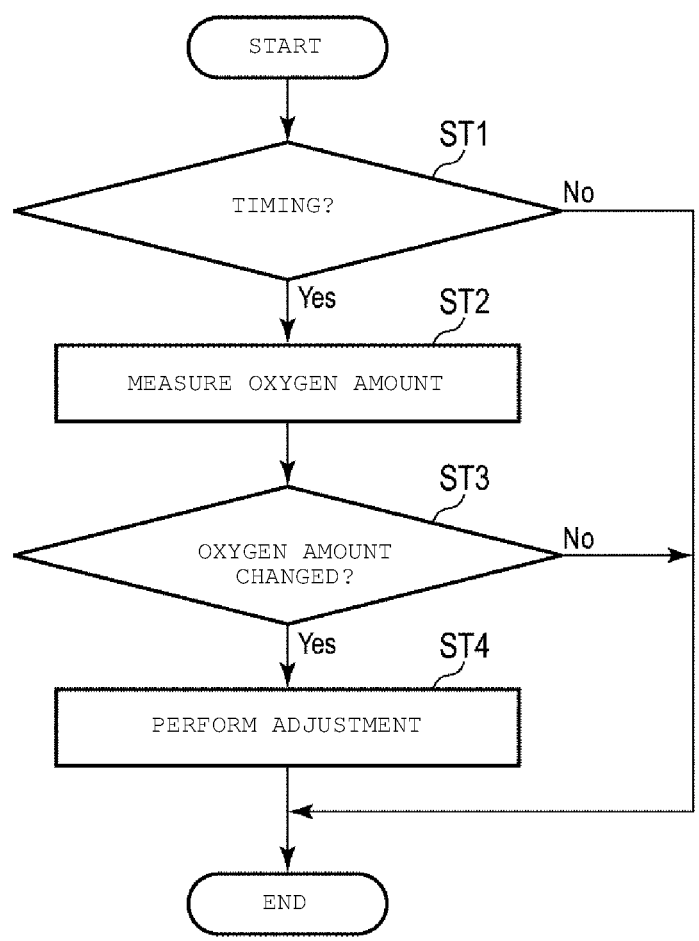
FIG. 4 is a flowchart showing an operation example of an oxygen amount monitor in the magnetic recording and reproducing device according to the embodiment.

FIG. 4 shows a flowchart showing an operation example of an oxygen amount monitor in the first magnetic recording and reproducing device according to the embodiment. First, it is determined whether it is time to check the oxygen amount (ST1). When No, the measurement of the oxygen amount is ended. When Yes, the oxygen amount measurement unit 180 periodically measures the oxygen amount (ST2). The timing of monitoring the oxygen amount is, for example, predetermined time intervals such as every day, or a timing of receiving a command from the host 170, or the like.

Then, it is determined whether the oxygen amount changed (ST3). When No, the measurement of the oxygen amount is ended. When Yes, the first magnetic recording and reproducing device can be adjusted so that the recording quality that changes depending on the oxygen amount is maintained constant (ST4), for example, the head fly height or the assist power can be adjusted. Here, the head fly height or the amount of assist power that changes depending on the amount of change in oxygen can be checked in advance by inspection at the time of shipment. Alternatively, it is possible to prepare a table based on the average values of a plurality of first magnetic recording and reproducing devices, and perform adjustment in accordance with the table.

Example 2

Figure 5:
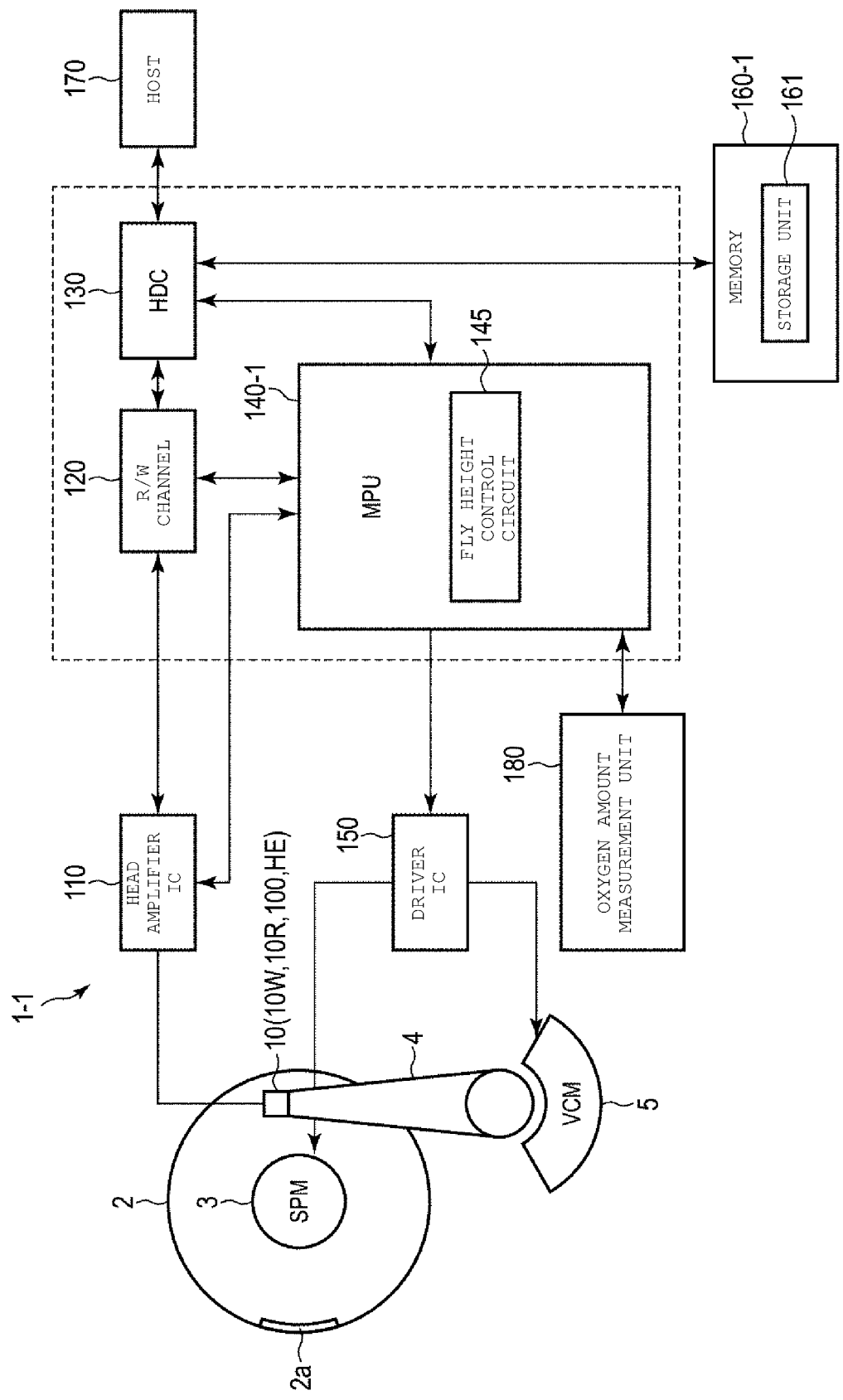
FIG. 5 is a block diagram showing still another example of the control configuration of the magnetic recording and reproducing device according to the embodiment.

Next, Example 2 will be described. FIG. 5 shows a block diagram showing an example of a control configuration of a second magnetic recording and reproducing device according to the embodiment. A second magnetic recording and reproducing device 1-1 can have a control configuration similar to the first magnetic recording and reproducing device 1 in FIG. 1 except that an MPU 140-1 is used instead of the MPU 140, and a memory 160-1 including a storage unit 161 that stores the head fly height, the amount of assist power, and tables thereof and the like in accordance with the amount of change in oxygen is used instead of the memory 160. The MPU 140-1 controls the head amplifier IC 110 in accordance with the measurement result of the oxygen amount received from the oxygen amount measurement unit 180, and includes a fly height control circuit 145 that can adjust the fly height of the head 10 by changing the voltage applied to the heater HE. Oxygen and He are enclosed in the second magnetic recording and reproducing device according to the embodiment.

Figure 6:
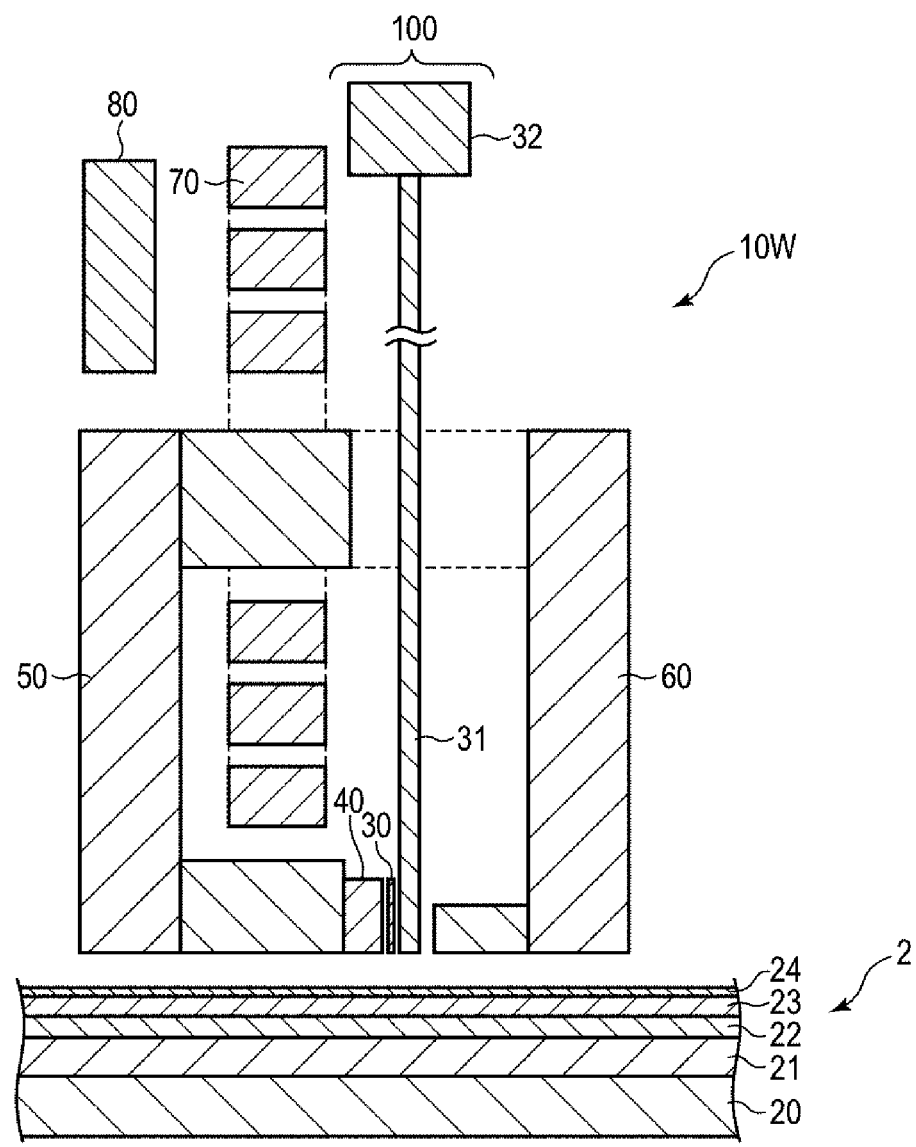
FIG. 6 is a cross-sectional view of a portion of the magnetic recording and reproducing device according to the embodiment.

FIG. 6 is a cross-sectional view of the write head 10W and the magnetic disk 2, which are portions of the magnetic recording and reproducing device in Example 1 according to the first and second magnetic recording and reproducing devices. The magnetic disk 2 includes a substrate 20, a heat sink layer 21, a crystal alignment layer 22, a perpendicular recording layer 23, and a protective layer 24. The heat sink layer 21, the crystal alignment layer 22, the perpendicular recording layer 23, and the protective layer 24 are sequentially stacked on the substrate 20. The perpendicular recording layer 23 has large anisotropy in a direction perpendicular to the disk surface. The crystal alignment layer 22 is disposed under the perpendicular recording layer 23 in order to improve the orientation of the perpendicular recording layer 23. The heat sink layer 21 is disposed under the crystal alignment layer 22 in order to limit the spread of the heated area. The protective layer 24 is disposed above the perpendicular recording layer 23 in order to protect the perpendicular recording layer 23, and includes a lubricating layer (not shown) coated with a lubricant on the surface of the lubricating layer.

The magnetic head 10 is a separated type magnetic head in which the write head 10W and the read head 10R are separated. The write head 10W includes a main magnetic pole 40 configured with a high permeability material that generates a magnetic field perpendicular to the disk surface, a trailing yoke 50 that causes magnetic flux to flow to the main magnetic pole 40 and is magnetically joined to the main magnetic pole, a return shield magnetic pole 60 that is disposed on the leading side of the main magnetic pole 40 and effectively closes a magnetic path directly under the main magnetic pole, a coil 70 that is wound around the magnetic path including the trailing yoke and the return shield magnetic pole in order to cause magnetic flux to flow to the main magnetic pole 40, a heater 80 as an example of the heater HE for controlling the fly height of a recording head, a near-field optical element 30 that generates near-field light for heating the perpendicular recording layer 23 of the magnetic disk 2 on the leading side of the main magnetic pole 40, and a waveguide 31 for causing light for generating the near-field light to propagate. A light source is incorporated in the form in which a laser diode 32 is mounted on the slider of the actuator assembly 4. As the near-field optical element 30, for example, Au, Pd, Pt, Rh, Ir, or an alloy configured with some combination thereof may be used. As an insulating layer (not shown) provided between the main magnetic pole 40 and the near-field optical element 30, for example, oxides configured with $SiO_2$, $Al_2O_3$ and the like may be used. The materials of the protective layer 24 and the lubricant have tendency of being decomposed by heat and light to release carbon and adhere to the near-field optical element 30, for example, but can be burned by oxygen enclosed in the device.

Figure 7:
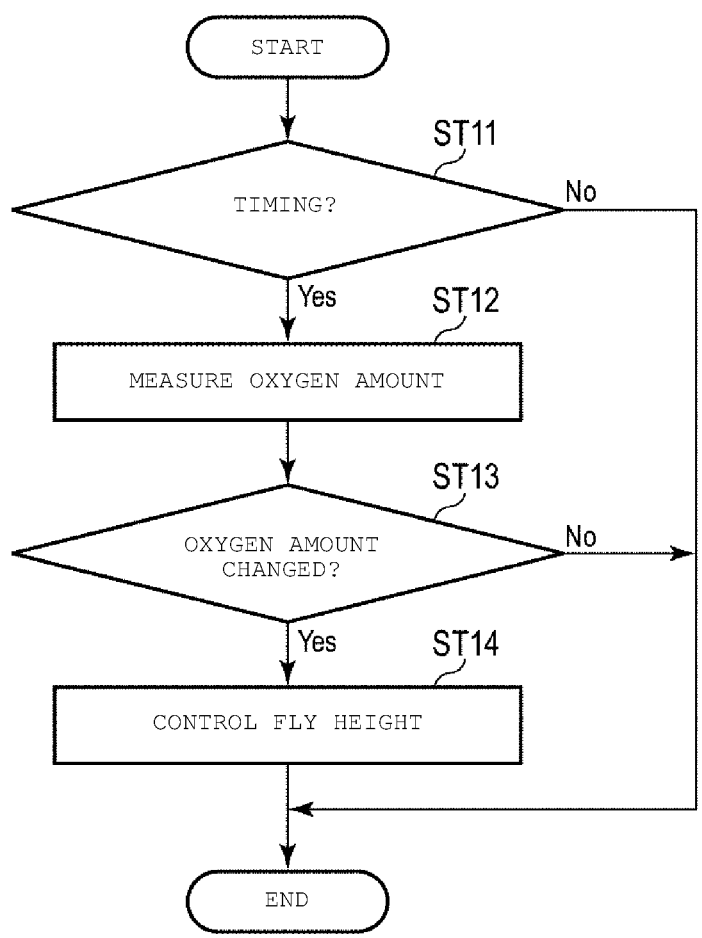
FIG. 7 is a flowchart showing another operation example of the oxygen amount monitor in the magnetic recording and reproducing device according to the embodiment.

FIG. 7 shows a flowchart showing another operation example of the oxygen amount monitor in the second magnetic recording and reproducing device according to the embodiment. In order to operate the oxygen amount monitor, first, the MPU 140-1 determines whether it is time to measure the oxygen amount (ST11). When No, the MPU 140-1 ends the measurement of the oxygen amount. When Yes, the oxygen amount measurement unit 180 periodically measures the oxygen amount (ST12). The timing of monitoring the oxygen amount is, for example, predetermined time intervals such as every day, or a timing of receiving a command from the host 170, or the like.

Then, the MPU 140-1 determines whether the oxygen amount changed in accordance with the measurement result of the oxygen amount received from the oxygen amount measurement unit 180 (ST13). When No, the MPU 140-1 ends the measurement of the oxygen amount. When Yes, for example, the fly height control circuit 145 can control the head amplifier IC 110, change the voltage applied to the heater HE, and adjust the fly height of the magnetic head 10 (ST14). Here, the data of the voltage applied to the heater HE corresponding to the amount of change in oxygen can be checked in advance by an inspection at the time of shipment and be stored in the storage unit 161. From the amount of change in oxygen, it is possible to check the pressure reduction in the second magnetic recording and reproducing device 1-1 and the change in the fly height of the magnetic head 10, for example, the reduction in the fly height. Alternatively, the voltage applied to the heater HE can be tabulated from the average values of a plurality of second magnetic recording and reproducing devices and be stored in the storage unit 161. When the oxygen amount changes, the fly height of the magnetic head 10 can be adjusted in accordance with the data or table acquired from the storage unit 161.

As described above, the second magnetic recording and reproducing device 1-1 according to the embodiment may further include the fly height control circuit 145 that controls the fly height of the magnetic head 10, in addition to the configuration of the first magnetic recording and reproducing device 1. By using the fly height control circuit 145, when the fly height of the magnetic head 10 changes due to a change in the oxygen amount in the enclosed interior volume of the device, the fly height of the magnetic head 10 can be controlled to adjust the second magnetic recording and reproducing device 1-1 in accordance with the change in the oxygen amount in the enclosed interior volume of the device 1-1. In addition, the oxygen amount measurement unit 180 can be equipped with a function of indirectly predicting the oxygen amount.

Figure 8:
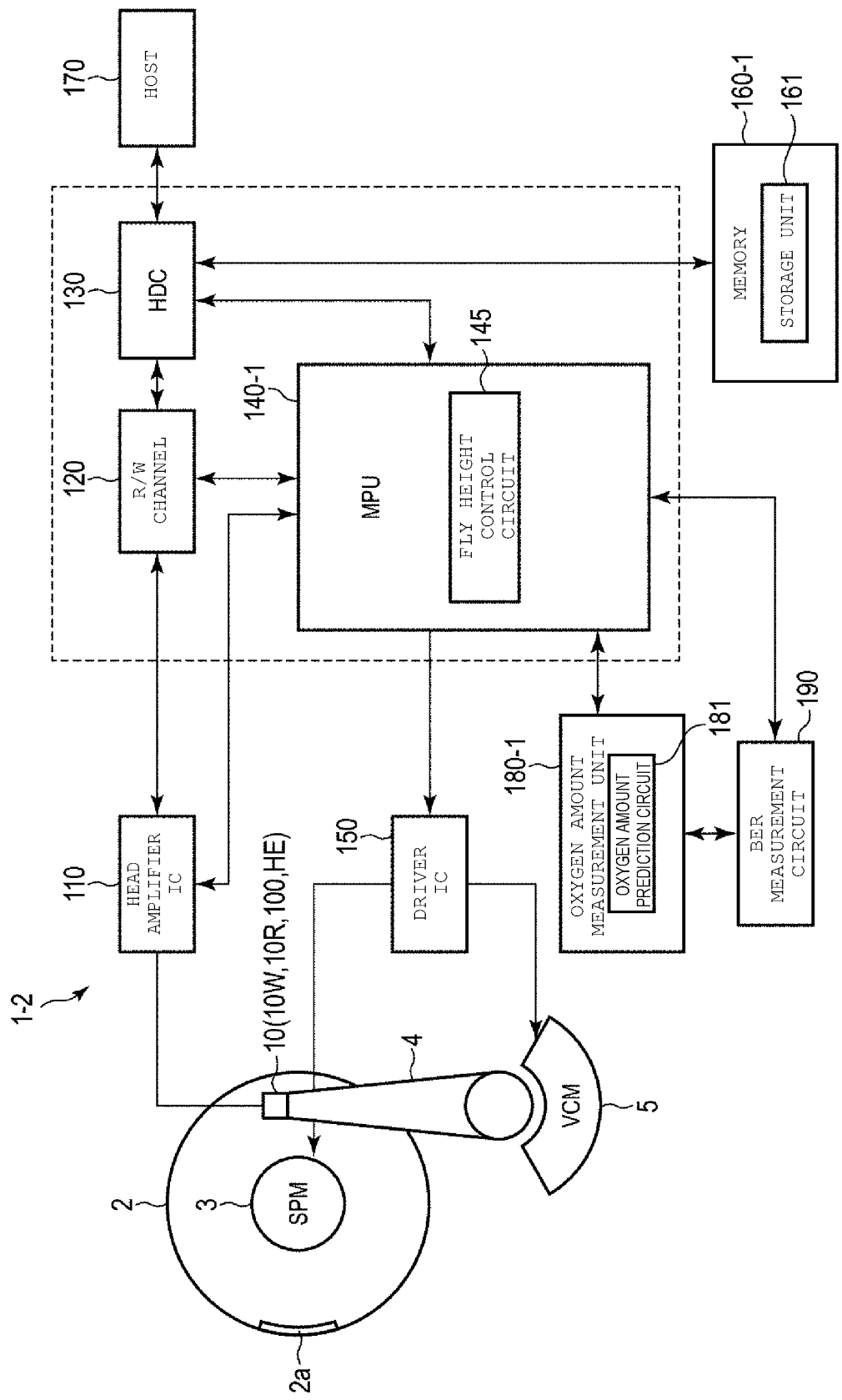
FIG. 8 is a block diagram showing a modification example of FIG. 5.

Here, a modification example of Example 2 will be described. FIG. 8 shows a block diagram showing the modification example of FIG. 5. As shown in FIG. 8, a third magnetic recording and reproducing device 1-2 can have a control configuration similar to the second magnetic recording and reproducing device 1-1 in FIG. 5 except that, instead of the oxygen amount measurement unit 180, the third magnetic recording and reproducing device 1-2 includes an oxygen amount measurement unit 180-1 that employs an oxygen amount prediction circuit 181 to indirectly predict the oxygen amount, and a bit error rate (BER) measurement circuit 190 that is connected to the oxygen amount prediction circuit 181 and the MPU 140-1 and measures the bit error rate. The oxygen amount prediction circuit 181 has a function of measuring the amount of change in the oxygen amount. In this function, an electrical characteristic measurement area is provided in a predetermined area on the medium 2, the electrical characteristic of the BER can be measured in this area, and the amount of change in oxygen can be predicted based on the amount of change in BER from the initial value at the time of shipment.

Figure 9:
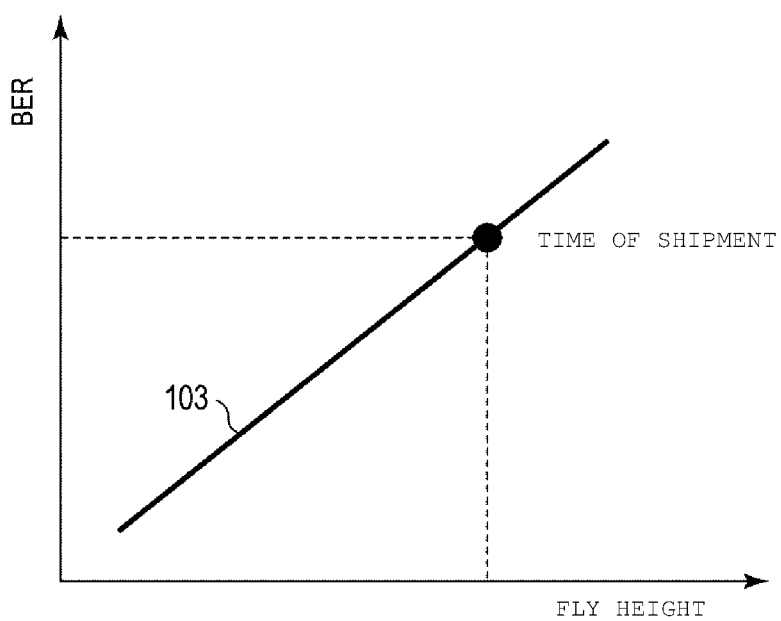
FIG. 9 is a graph showing an amount of change in bit error rate.

FIG. 9 shows a graph showing the amount of change in BER with respect to the amount of change in fly height, which was previously examined in an inspection at the time of shipment. The reference sign 103 indicates a graph showing the relationship between the fly height and the BER. The graph as shown in FIG. 9 can be stored. The BER can be measured at the timing of periodically measuring the oxygen amount, and the amount of change in fly height and the amount of change in oxygen can be predicted from the amount of change in BER. The voltage applied to the heater HE can be changed based on the amount of change from the initial value of the oxygen amount. Here, characteristics such as SN and a signal output may be used instead of the BER.

Example 3

Figure 10:
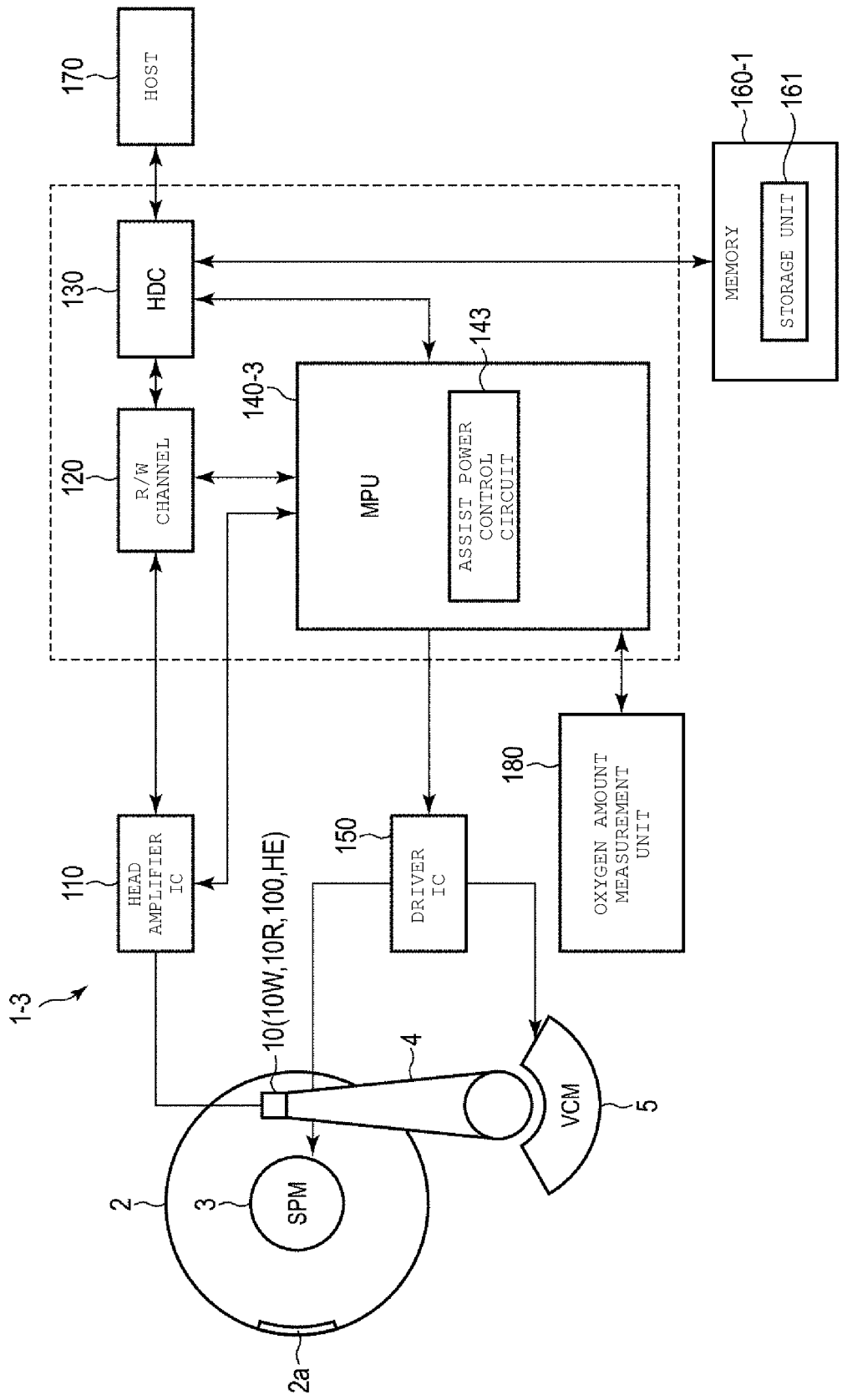
FIG. 10 is a block diagram showing still yet another example of the control configuration of the magnetic recording and reproducing device according to the embodiment.

Next, Example 3 will be described. FIG. 10 shows a block diagram showing an example of a control configuration of a fourth magnetic recording and reproducing device according to the embodiment. A fourth magnetic recording and reproducing device 1-3 can have a control configuration similar to the first magnetic recording and reproducing device 1 in FIG. 1 except that an MPU 140-3 is used instead of the MPU 140, and a memory 160-1 including a storage unit 161 that stores the head fly height, the amount of assist power, and tables thereof and the like in accordance with the amount of change in oxygen is used instead of the memory 160. The MPU 140-3 includes an assist power control circuit 143 that applies assist power to the heat assist element to perform heat-assisted recording. The assist power control circuit 143 can control the head amplifier IC 110 in accordance with the measurement result of the oxygen amount received from the oxygen amount measurement unit 180, change the assist power applied to the heat assist element, and perform heat-assisted recording. Oxygen and He are enclosed in the fourth magnetic recording and reproducing device according to the embodiment.

Figure 11:
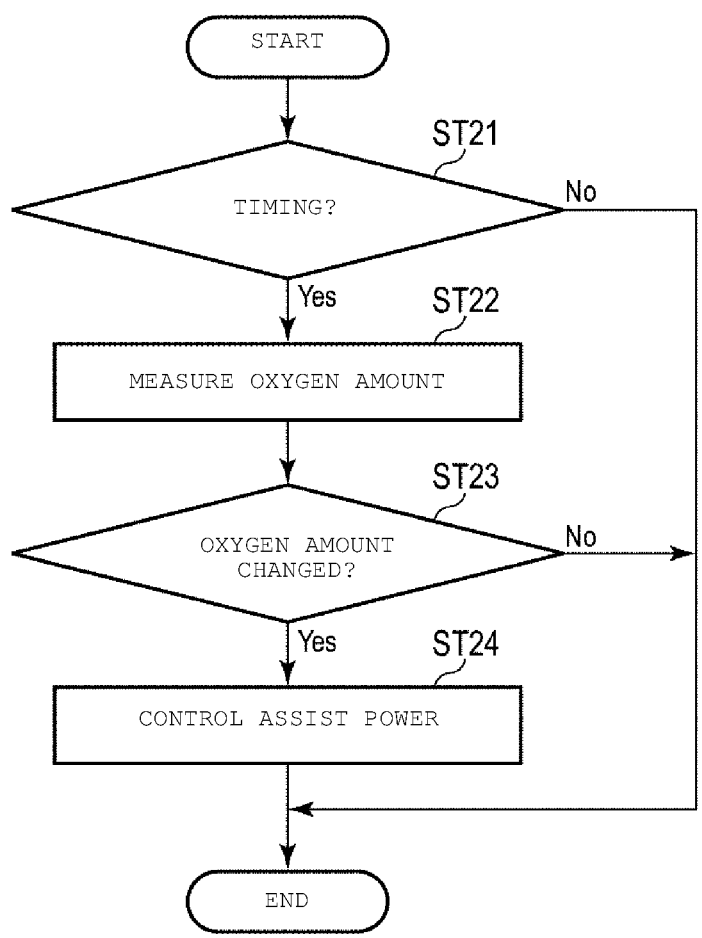
FIG. 11 is a flowchart showing still another operation example of the oxygen amount monitor in the magnetic recording and reproducing device according to the embodiment.

FIG. 11 shows a flowchart showing an operation example of the oxygen amount monitor in the fourth magnetic recording and reproducing device according to the embodiment. In order to operate the oxygen amount monitor, first, the MPU 140-3 determines whether it is time to check the oxygen amount (ST21). When No, the MPU 140-3 ends the check of the oxygen amount. When Yes, the oxygen amount measurement unit 180 periodically measures the oxygen amount (ST22). The timing of monitoring the oxygen amount is, for example, predetermined time intervals such as every day, or a timing of receiving a command from the host 170, or the like.

Then, the MPU 140-3 determines whether the oxygen amount changed in accordance with the measurement result of the oxygen amount received from the oxygen amount measurement unit 180 (ST23). When No, the MPU 140-3 ends the measurement of the oxygen amount. When Yes, for example, the assist power control circuit 143 can control the head amplifier IC 110, change the voltage applied to the assist element 30, and adjust the assist power (ST24). Here, the assist element 30 is a near-field optical element as the heat assist element, and further includes a laser light source 32 that outputs laser light to the near-field optical element. The assist power control circuit 143 can control the laser power, for example, the current applied to the laser light source 32. Data of laser power corresponding to the amount of change in oxygen can be checked in advance by an inspection at the time of shipment and be stored in the storage unit 161. Alternatively, the laser power can be tabulated from the average values of a plurality of fourth magnetic recording and reproducing devices and be stored in the storage unit 161. When the oxygen amount changes, the laser power can be adjusted in accordance with the data or table acquired from the storage unit 161.

As described above, the fourth magnetic recording and reproducing device according to the embodiment may further include the assist power control circuit 143 that controls the assist power supplied to the heat assist element 30 in addition to the configuration of the first magnetic recording and reproducing device. By using the assist power control circuit 143, even when the fly height of the magnetic head 10 changes due to the change in the oxygen amount in the enclosed interior volume of the device 1-3, and the heat assist effect of the heat assist element 30 changes, it is possible to adjust the fourth magnetic recording and reproducing device 1-3 corresponding to the change in the oxygen amount in the enclosed interior volume of the device.

In addition, the oxygen amount measurement unit 180 can be equipped with a function of indirectly predicting the oxygen amount. For example, similar to the third magnetic recording and reproducing device 1-2 shown in FIG. 8, an oxygen amount measurement unit 180-1 including the oxygen amount prediction circuit 181 that indirectly predicts the oxygen amount may be provided instead of the oxygen amount measurement unit 180, and a BER measurement circuit 190 that is connected to the oxygen amount prediction circuit 181 and the MPU 140-3 and measures the bit error rate (BER) may be further provided.

The oxygen amount prediction circuit 181 has a function of measuring the amount of change in the oxygen amount. In this function, an electrical characteristic measurement area is provided in a predetermined area on the medium 2, the electrical characteristic of the BER can be measured in this area, and the amount of change in oxygen can be predicted based on the amount of change in BER from the initial value at the time of shipment. For example, it is possible to measure the BER at the timing of periodically measuring the oxygen amount, and predict the amount of change in fly height and the amount of change in oxygen from the amount of change in BER. The laser power can be changed based on the amount of change from the initial value of the oxygen amount. Here, characteristics such as SN and a signal output may be used instead of the BER.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic recording and reproducing device comprising:
    a magnetic recording medium including a protective layer that is exposed to an enclosed interior volume of the magnetic recording and reproducing device, which contains oxygen and helium;
    a magnetic head including a heat assist element that is also exposed to the enclosed interior volume, the magnetic head configured to record data onto the magnetic recording medium; and
    an oxygen amount measurement unit configured to measure an oxygen amount in the enclosed interior volume, wherein
    the oxygen amount measurement unit includes an oxygen amount prediction circuit configured to predict the oxygen amount based on a bit error rate in data read from the magnetic recording medium.

2. The magnetic recording and reproducing device according to claim 1, further comprising:
    a fly height control circuit configured to control a fly height of the magnetic head.

3. The magnetic recording and reproducing device according to claim 2, wherein the fly height control circuit adjusts the fly height of the magnetic head based on the oxygen amount in the enclosed interior volume.

4. The magnetic recording and reproducing device according to claim 1, further comprising:
    an assist power control circuit configured to apply assist power to the heat assist element to perform heat-assisted recording.

5. The magnetic recording and reproducing device according to claim 4, wherein the assist power control circuit adjusts the assist power applied to the heat assist element based on the oxygen amount in the enclosed interior volume.

6. The magnetic recording and reproducing device according to claim 1, further comprising:
    a bit error rate measurement circuit configured to measure the bit error rate in data read from a predetermined area of the magnetic recording medium.

7. The magnetic recording and reproducing device according to claim 1, wherein
    the oxygen amount within the enclosed interior volume is 1% to 20% by volume.

8. A magnetic recording and reproducing device comprising:
    a magnetic recording medium including a protective layer that is exposed to an enclosed interior volume of the magnetic recording and reproducing device, which contains oxygen and helium;
    a magnetic head including a heat assist element that is also exposed to the enclosed interior volume, the magnetic head configured to record data onto the magnetic recording medium; and
    an oxygen amount prediction circuit configured to predict an oxygen amount in the enclosed interior volume based on a bit error rate in data read from the magnetic recording medium.

9. The magnetic recording and reproducing device according to claim 8, further comprising:
    a bit error rate measurement circuit configured to measure the bit error rate in data read from a predetermined area of the magnetic recording medium.

10. The magnetic recording and reproducing device according to claim 9, further comprising:
    a fly height control circuit configured to control a fly height of the magnetic head.

11. The magnetic recording and reproducing device according to claim 10, wherein the fly height control circuit adjusts the fly height of the magnetic head based on the oxygen amount in the enclosed interior volume.

12. The magnetic recording and reproducing device according to claim 9, further comprising:
    an assist power control circuit configured to apply assist power to the heat assist element to perform heat-assisted recording.

13. The magnetic recording and reproducing device according to claim 12, wherein the assist power control circuit adjusts the assist power applied to the heat assist element based on the oxygen amount in the enclosed interior volume.

14. The magnetic recording and reproducing device according to claim 8, wherein
    the oxygen amount within the enclosed interior volume is 1% to 20% by volume.

15. A method of controlling a magnetic recording and reproducing device that comprises a magnetic recording medium including a protective layer that is exposed to an enclosed interior volume of the magnetic recording and reproducing device, which contains oxygen and helium, and a magnetic head including a heat assist element that is also exposed to the enclosed interior volume, the magnetic head configured to record data onto the magnetic recording medium, said method comprising:
  performing a read on a predetermined region of the magnetic recording medium;
  predicting an oxygen amount in the enclosed interior volume based on a bit error rate in the data read from the predetermined region; and
  controlling a fly height of the magnetic head or power applied to the heat assist element based on the predicted oxygen amount.

16. The method according to claim 15, wherein the oxygen amount within the enclosed interior volume is 1% to 20% by volume.

* * * * *